July 9, 1935. B. N. PIERCE 2,007,502
SUPPORT FOR SIGHT FEED LUBRICATING DEVICE
Filed July 23, 1931

Inventor
By B. N. PIERCE,
Pattison Wright & Pattison
Attorney

Patented July 9, 1935

2,007,502

UNITED STATES PATENT OFFICE 2,007,502

SUPPORT FOR SIGHT FEED LUBRICATING DEVICE

Burt N. Pierce, New York, N. Y., assignor to Emerol Manufacturing Co., New York, N. Y., a corporation of Illinois Application July 23, 1931, Serial No. 552,728

4 Claims. (Cl. 248—278)

This invention relates to certain new and useful improvements in lubricating system for internal combustion engines and more particularly to the means for securing the lubricating device to the dash of a motor vehicle and is an improvement upon my Lubricating system for motor vehicles filed December 8, 1930, Serial Number 500,928.

In a companion application filed even date herewith, I have shown a construction of lubricating system in which a housing is provided with a diaphragm for controlling the supply of lubricant drawn to the cylinders of the engine by the piston displacement, said housing having a fuel inlet and a fuel outlet and a sight opening whereby the amount of fuel can be controlled and under the observation of the user at all times.

Another object of my invention is to provide a sight feed lubricating device comprising a housing having an inlet nipple extending therefrom on which is adjustably mounted a split collar having a bolt extending through apertures of the ears of said collar carrying arms which are capable of being adjusted independently, said bolt carrying nuts at its ends for clamping the arms in the split collar in their adjusted position whereby the device can be adjusted to the various shapes and styles of dash boards of motor vehicles and secured in position therein so that the housing will be held in vertical position irrespective of the construction of dash.

Other and further objects of the invention will be hereinafter set forth and the novel features thereof defined by the appended claims.

Figure 1:
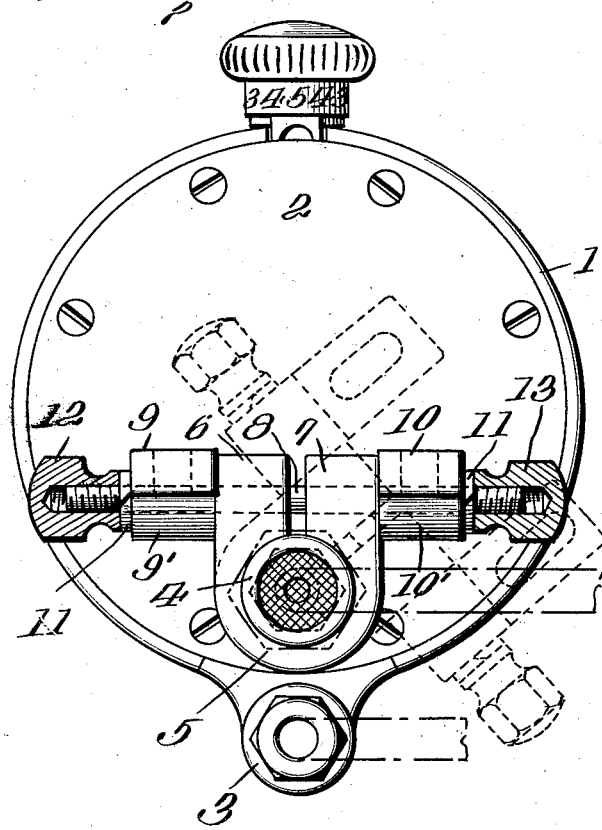
Figure 1 is a rear elevation of a sight feed lubricating device constructed in accordance with my invention.
Figure 2:
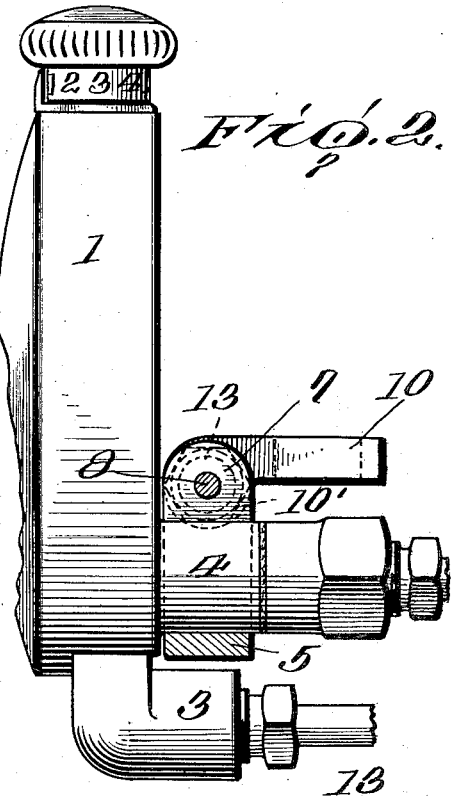
Figure 2 is a side elevation, partly broken away, showing the manner of securing the split collar and arms to the nipple of the housing.
Figure 3:
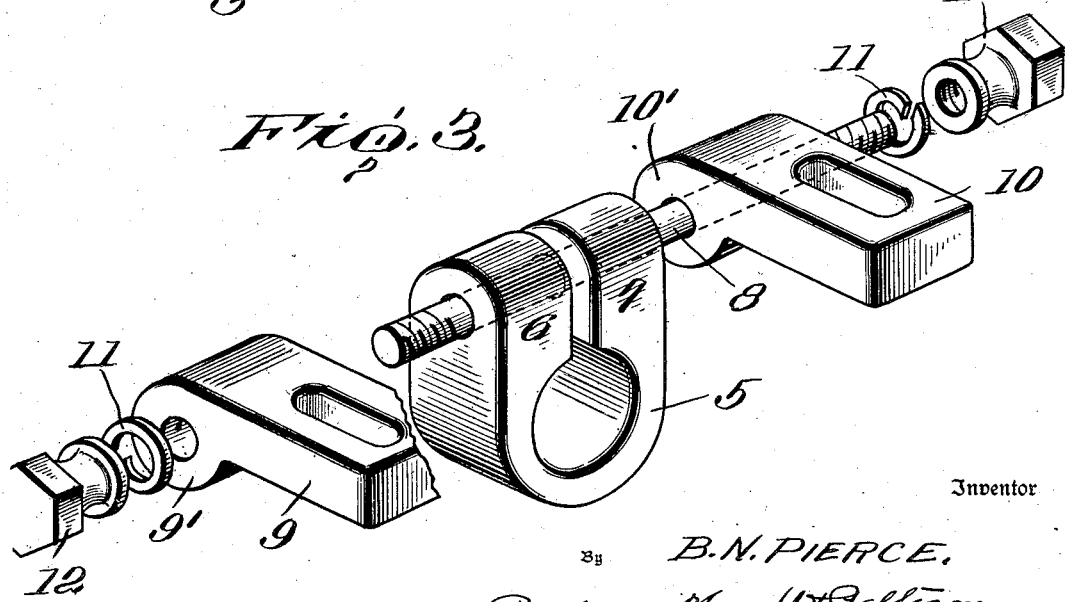
Figure 3 is a perspective view of the split collar, bolt and nuts showing the same in their respective positions ready to be assembled on the nipple of the housing.

In the construction of housing herein shown which contains the controlling means for the lubricating system, I employ a cover portion 1 and a back portion 2, said cover portion being provided with an outlet nipple 3 and the back portion with an inlet nipple 4.

The housing and cover are secured together by any suitable means and are adapted to contain means for regulating the supply of lubricant being sucked to the cylinders of the engine as clearly shown and described in my companion application filed even date herewith.

Arranged on the nipple 4 is a split collar 5 provided with apertured ears 6 and 7 through which a bolt 8 is adapted to pass, said bolt having threaded ends and forming bearings for the hub portions 9' and 10' of slotted arms 9 and 10 to form means for securing the same to the dash of the motor vehicle, suitable fastening means extending through the slotted portions of the arms 9 and 10 for securing the arms to the dash of a motor vehicle or to any other part thereof so that the housing containing the sight opening will be in such a position that it can be clearly observed by the operator of the motor vehicle to which the device is attached. In practice bolts are passed through the slotted arms 9 and 10 and through suitable openings formed in the dash of the vehicle or any other portion thereof where it is desired to secure the device so that these arms will be rigidly attached to a fixed portion of the motor vehicle and by having these arms slotted, these arms can be adjusted on the bolts employed for fastening the device to the motor vehicle.

Arranged over the bolt 8 against the outer faces of the hub portions 9' and 10' of the arms 9 and 10 are flexible washers 11 which are adapted to be engaged by nuts 12 and 13 working on the threaded ends of the bolt 8 so as to clamp the hub portions 9' and 10' against the outer faces of the ears 6 and 7 and it will be seen that as the nuts are turned to clamp the arms, the apertured ears are drawn together so as to clamp the split collar 5 in its adjusted position on the nipple 4 of the housing.

In the elevation shown in Figure 1, the split collar is shown arranged obliquely in dotted lines on the nipple 4 in order to attach the housing to a part of the motor vehicle in order to support the housing in vertical position irrespective of the position of the supporting means.

As the loosening or the tightening of either of the nuts 12 or 13 allows either the arms 9 or 10 or the collar 5 to be swung on its pivot, it will be readily seen that each arm is capable of being adjusted independently of the other and that the collar can be swung on the nipple to either side or to any position desired and by simply screwing up on one of the nuts all of the parts of the supporting means will be clamped rigidly.

While in the drawing I have shown two nuts carried by the bolt, I am aware that it is not essential that two nuts be employed for clamping the various members in their adjusted position thereon as a bolt with a head and a single nut could be used to accomplish the same result, but by having a nut at each end the placing of the housing in position on a motor vehicle is greatly facilitated.

While I have described my invention especially adapted to be used in connection with motor vehicles, I am of course, aware that a lubricating device as herein shown and described can be used in connection with motor boats and stationary engines, and that the adjustable supporting means for the housing thereof can be attached to any stationary member so that the sight feed housing can be adjusted after being attached to an irregular support so that said housing will be supported in a vertical position irrespective of the position of the supporting means employed for attaching the same to the rigid support and therefore I do not wish to limit myself to the application of the lubricating device to any particular type of engine.

What I claim is:—

1. In a mounting device for housings having a nipple extending therefrom, a split collar mounted on said nipple provided with apertured ears, a bolt extending through said apertured ears, arms independently pivotally mounted on said bolt provided with means adapting them to be secured to a fixed support, and a nut for clamping said arms in their adjusted position and said collar on said nipple.

2. A lubricating device comprising a housing having an inlet nipple, a split collar pivotally mounted on said nipple having apertured ears, a bolt extending through said apertured ears, arms independently provided with hub portions mounted on said bolt provided with means adapting them to be secured to a fixed support, flexible washers arranged on said bolt and nuts carried by said bolt for clamping said arms against the outer faces of said apertured ears and simultaneously drawing said ears towards each other for clamping said collar on the nipple of said housing.

3. In a lubricating device, a housing having a nipple, a member pivotally mounted on said nipple, arms independently pivotally carried by said member having means adapting them to be secured to a fixed support, and means for clamping said member and arms in adjusted position.

4. An instrument housing having a circular projection, a bifurcated member adapted to receive said projection to allow said projection to oscillate therein, the furcations of said bifurcated member being apertured, a bolt passing through the apertures of said furcations, a pair of independently adjustable arms mounted on said bolt and capable of moving in paths at an angle to one another, said arms being provided with apertures to receive fastening means for securing said arms to a support and nuts carried by the ends of said bolt for locking said members in their adjusted positions.

BURT N. PIERCE.